United States Patent
Bhattarai et al.

(10) Patent No.: US 11,755,958 B1
(45) Date of Patent: Sep. 12, 2023

(54) SYSTEMS AND METHODS FOR DETECTING CRYPTOCURRENCY WALLET ARTIFACTS IN A FILE SYSTEM

(71) Applicants: Abhishek Bhattarai, Miami, FL (US); Maryna Veksler, Miami, FL (US); Ahmet Kurt, Miami, FL (US); Abdulhadi Sahin, Miami, FL (US); Kemal Akkaya, Miami, FL (US)

(72) Inventors: Abhishek Bhattarai, Miami, FL (US); Maryna Veksler, Miami, FL (US); Ahmet Kurt, Miami, FL (US); Abdulhadi Sahin, Miami, FL (US); Kemal Akkaya, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/312,081

(22) Filed: May 4, 2023

(51) Int. Cl.
*G06N 20/00* (2019.01)
*G06N 3/043* (2023.01)

(52) U.S. Cl.
CPC ............. *G06N 20/00* (2019.01); *G06N 3/043* (2023.01)

(58) Field of Classification Search
CPC .............................. G06N 20/00; G06N 3/043
See application file for complete search history.

(56) References Cited

U.S. PATENT DOCUMENTS

2022/0405401 A1* 12/2022 McCarthy ............. G06F 21/577

OTHER PUBLICATIONS

Holmes, Arran, and William J. Buchanan. "A framework for live host-based Bitcoin wallet forensics and triage." Forensic Science International: Digital Investigation 44 (2023): 301486. Available Dec. 2022. (Year: 2022).*

Montanez, Angelica. "Investigation of cryptocurrency wallets on iOS and Android mobile devices for potential forensic artifacts." Department Forensic Science, Marshall University: Huntington, WV, USA (2014). (Year: 2014).*

* cited by examiner

*Primary Examiner* — Eric Nilsson
(74) *Attorney, Agent, or Firm* — Saliwanchik, Lloyd & Eisenschenk

(57) ABSTRACT

Systems, methods, and frameworks for detecting cryptocurrency wallet artifacts in a file system of a device are provided. The cryptocurrency wallet artifacts can be automatically detected and can include: (i) cryptocurrency wallet application folders; (ii) images containing cryptocurrency artifacts (e.g., mnemonics phrases and/or transactions information); and/or (iii) web browsers artifacts (e.g., cache data, credentials, cookies, and/or bookmarks). This information can be analyzed and extracted using machine learning (ML), natural language processing (NLP), a convolution neural network (CNN), a recurrent neural network (RNN), and/or a string search algorithm.

20 Claims, 14 Drawing Sheets

| Web Browser | Folder Name |
|---|---|
| Mozila Firefox | /data/data/org.mozilla.firefox |
| Samsung Internet | /data/data/com.sec.android.app.sbrowser |
| Opera Browser | /data/data/com.opera.browser |
| Google Chrome | /data/data/com.android.chrome |

FIG. 8

| Data Type | Data | File Location |
|---|---|---|
| URLs | http://crypto.com, crypto.com, The Best Place to Buy, Sell, and Pay with Cryptocurrency | /app_sbrowser/Default/History |
| Cookies | crypto.com, /price | /app_sbrowser/Default/Cookies |
| Bookmarks | https://www.coinbase.com, Coinbase - Buy and Sell Bitcoin, Ethereum, and more with trust | /databases/SBrowser.db |

FIG. 9

|  | Support Vector Machine | | | | Logistic Regression | | | |
| --- | --- | --- | --- | --- | --- | --- | --- | --- |
|  | Precision | Recall | F1 score | Support | Precision | Recall | F1 score | Support |
| Crypto Exchange | 0.85 | 0.71 | 0.77 | 41 | 0.83 | 0.71 | 0.76 | 41 |
| Crypto Portfolio | 0.60 | 0.23 | 0.33 | 13 | 0.50 | 0.15 | 0.24 | 13 |
| Crypto tracker | 0.79 | 0.91 | 0.85 | 34 | 0.78 | 0.91 | 0.84 | 34 |
| Crypto wallet | 0.82 | 0.96 | 0.89 | 57 | 0.82 | 0.95 | 0.88 | 57 |
| Accuracy |  |  | 0.81 | 145 |  |  | 0.80 | 145 |
| Macro Avg | 0.77 | 0.70 | 0.71 | 145 | 0.73 | 0.68 | 0.68 | 145 |
| Weighted Avg | 0.80 | 0.81 | 0.80 | 145 | 0.78 | 0.80 | 0.78 | 145 |

FIG. 10

|  | No Spelling Check | w/ Spelling Check |
| --- | --- | --- |
| bitcoin | 'bitcoin' | 'bitcoin' |
| wallet | 'wallet' | 'wallet' |
| btc | 'btc', 'bite', 'tc' | 'btc', 'bite', 'tc' |
| coin | 'coin', 'coln', 'coin', 'con' | 'coin', 'coln', 'coin', 'con' |
| chain | 'chain' | 'chain' |
| nft | 'nft', 'nt', 'net', 'ft', 'nbt' | 'nft', 'nt', 'net', 'ft', 'nbt' |
| token | 'token' | 'token' |

FIG. 11

| | # of words | Recall | Precision |
|---|---|---|---|
| Handwritten image 1 | 12 | 1.00 | 0.71 |
| Handwritten image 2 | 16 | 0.98 | 0.64 |
| Handwritten image 3 | 12 | 1.00 | 0.61 |
| Handwritten image 4 | 9 | 1.00 | 0.78 |
| Handwritten image 5 | 8 | 0.97 | 0.75 |
| Handwritten image 6 | 12 | 1.00 | 0.69 |
| Screenshot image 1 | 12 | 0.92 | 0.92 |
| Screenshot image 2 | 14 | 0.98 | 0.98 |
| Screenshot image 3 | 25 | 1.00 | 1.00 |
| Screenshot image 4 | 10 | 0.89 | 0.89 |
| Screenshot image 5 | 30 | 0.93 | 0.93 |

FIG. 12

|  | Includes Mnemonic Phrases | Recall | Requires consideration |
|---|---|---|---|
| Handwritten image 1 | True | 75.0% | Yes |
| Handwritten image 2 | False | 28.4% | No |
| Handwritten image 3 | True | 73.6% | Yes |
| Handwritten image 4 | False | 26.4% | No |
| Handwritten image 5 | False | 39.2% | No |
| Handwritten image 6 | True | 70.8% | Yes |
| Screenshot image 1 | False | 30.9% | No |
| Screenshot image 2 | False | 36.1% | No |
| Screenshot image 3 | False | 19.8% | No |
| Screenshot image 4 | False | 41.4% | No |
| Screenshot image 5 | False | 0.09% | No |

FIG. 13

| Bookmarks | Visited Websites | Searches |
|---|---|---|
| freewallet.org | freewallet.org | cryptowallets online |
| nerdwallet.com | coinbase.com | set up anonymous cryptowallet |
| coinbase.com | cryptowallet.com | untraceable online crypto transactions |
| | nerdwallet.com | |
| | binance.com | |

FIG. 14

| Browser | SQLite Databases | JSON dictionaries | Plain Text |
|---|---|---|---|
| Google Chrome | 7 | 3 | 745 |
| Samsung Internet | 8 | 2 | 486 |
| Firefox | 12 | 4 | 411 |
| Opera | 6 | 0 | 417 |

FIG. 15

|  | Google Chrome | Firefox | Opera | Samsung Internet |
|---|---|---|---|---|
| History | 31 | 20 | 20 | 26 |
| Bookmarks | 1 | 1 | 1 | 2 |
| Cookies | 42 | 18 | 21 | 32 |
| Favicons | 38 | N/A | N/A | 25 |
| Recent Tabs | 2 | 0 | 0 | 1 |
| Cache | 650 | 152 | 310 | 344 |
| Top Sites | 2 | 1 | 1 | 2 |
| Login Data | 2 | 1 | 1 | N/A |
| Network Persistent State | 10 | 9 | 7 | 5 |
| QuotaManager | 2 | N/A | 2 | 1 |
| Suggestions | N/A | 1 | 9 | N/A |

FIG. 16

|  | Cellebrite | Our Approach |
|---|---|---|
| Bookmarks | 66% | 100% |
| Visited Websites | 60% | 100% |
| Searches | 100% | 100% |

FIG. 17

|  | Google Chrome | Samsung Internet | Opera | Firefox |
|---|---|---|---|---|
| Visited Websites | ✓ |  | ✓ | ✓ |
| Google Searches | ✓ | ✓ | ✓ | ✓ |
| Bookmarks | ✓ | ✓ | ✓ | ✓ |
| Cookies | ✓ | ✓ | ✓ | ✓ |
| Cache | ✓ | ✓ | ✓ | ✓ |
| Credentials |  |  | ✓ | X |

FIG. 18

SYSTEMS AND METHODS FOR DETECTING CRYPTOCURRENCY WALLET ARTIFACTS IN A FILE SYSTEM

GOVERNMENT SUPPORT

This invention was made with government support under 1739805 awarded by National Science Foundation. The government has certain rights in the invention.

BACKGROUND

The adoption of the cryptocurrency has been expanding in the last decade. The convenience of performing financial transactions in a decentralized, secure, and peer-to-peer manner has made cryptocurrencies popular and in some cases a preferable means of payment over traditional payment methods. Multiple cryptocurrencies have been introduced with various features and market capitalization, such as Bitcoin, Ethereum, and Monero.

Cryptocurrencies are held in cryptocurrency wallet applications and can be used in financial transactions with the associated private key of the wallet. Wallets can communicate with the underlying blockchain software to allow users to send and receive cryptocurrencies with ease. Like most software, cryptocurrency wallets also generate files on devices where they are deployed. These generated files are called artifacts, and they include but are not limited to log files, databases, and mnemonic files. Crypto wallets can vary in type, including mobile wallets, desktop wallets, multi-coin wallets, and web-based wallets.

BRIEF SUMMARY

Embodiments of the subject invention provide novel and advantageous systems, methods, and frameworks for detecting cryptocurrency wallet (or "crypto wallet") artifacts in a file system (e.g., the file system of a smart device, such as an Android® smart device). The crypto wallet artifacts can be automatically detected and can include: (i) crypto wallet application folders; (ii) images containing crypto artifacts (e.g., mnemonics phrases and/or transactions information); and/or (iii) web browsers artifacts (e.g., cache data, credentials, cookies, and/or bookmarks). This information can be analyzed and extracted using machine learning (ML), natural language processing (NLP), a convolution neural network (CNN), a recurrent neural network (RNN), and/or a string search algorithm.

In an embodiment, a system for detecting cryptocurrency wallet artifacts in a file system of a device can comprise: a processor; a display; and a machine-readable medium in operable communication with the processor and the display and having instructions stored thereon that, when executed by the processor, perform the following steps: a) searching the file system of the device using an ML classifier to detect cryptocurrency related applications installed on the device; b) generating a first list of cryptocurrency related applications installed on the device based on step a); c) analyzing images stored on the file system of the device using a neural network based model to detect cryptocurrency related images stored on the device; d) generating a second list of cryptocurrency related images stored on the device based on step c); e) analyzing a web browser installed on the file system of the device to detect cryptocurrency related browsing activity on the device; f) generating a third list of cryptocurrency related browsing activity on the device based on step e); and g) displaying, on the display via a graphical user interface stored on the machine-readable medium, the first list, the second list, and the third list. The ML classifier used in step a) can comprise a logistic regression based ML classifier and/or a support vector machine (SVM). Step a) can comprise the sub-steps of: a1) comparing all applications on the file system of the device to a local database stored on the machine-readable medium, where each application on the file system of the device that matches an application listed in the local database is determined to be a cryptocurrency related applications or not based on its status in the local database, and where each application on the file system of the device that does not match any application listed in the local database is searched in step a2); a2) searching an application store (e.g., Google Playstore) for all applications on the file system of the device that did not match any application listed in the local database; and a3) for each application on the file system of the device that did not match any application listed in the local database, using NLP on a description of the respective application in the application store and categorize the respective application as be a cryptocurrency related applications or not based on the analysis of the description of the respective application in the application store. The instructions when executed can further perform the following step: prior to step a3), performing preprocessing on the description of each respective application on the file system of the device that did not match any application listed in the local database. The preprocessing can comprise at least one of removal of noises, text tokenization, removal of stop words, and word lemmatization. The neural network based model used in step c) can be a CNN based model, such as a CNN based model combined with fuzzy search. Step c) can comprise the sub-steps of: c1) using at least one neural network to filter the images stored on the file system of the device into three categories, the three categories comprising images with no text, images with printed text, and images with handwritten text; c2) using optical character recognition (OCR) to extract text information from the images with printed text; c3) using handwriting text recognition (HTR) to extract text information from the images with handwritten text; and c4) using a fuzzy search to detect cryptocurrency related images based on the extracted text information from the images with printed text and the extracted text information from the images with handwritten text. The instructions when executed can further perform the following step: prior to step c1), filtering out from among the images stored on the file system of the device graphics used for a user interface on the device, where step c1) is performed only on the images stored on the file system of the device that are not filtered out in this step. The analyzing of the web browser installed on the file system of the device can comprise analyzing a web history, bookmarks, user credentials, cookies, and/or a cache of the web browser. The device can be, for example, a phone (e.g., a smartphone, such as an Android® smartphone).

In another embodiment, a method for detecting cryptocurrency wallet artifacts in a file system of a device can comprise: a) searching (e.g., by a processor) the file system of the device using an ML classifier to detect cryptocurrency related applications installed on the device; b) generating (e.g., by the processor) a first list of cryptocurrency related applications installed on the device based on step a); c) analyzing (e.g., by the processor) images stored on the file system of the device using a neural network based model to detect cryptocurrency related images stored on the device; d) generating (e.g., by the processor) a second list of cryptocurrency related images stored on the device based on step c); e) analyzing (e.g., by the processor) a web browser installed on the file system of the device to detect cryptocurrency related browsing activity on the device; f) generating (e.g., by the processor) a third list of cryptocurrency related browsing activity on the device based on step e); and g) displaying (e.g., by the processor), on a display (in operable communication with the processor) via a graphical user interface, the first list, the second list, and the third list. The ML classifier used in step a) can comprise a logistic regression based ML classifier and/or an SVM. Step a) can comprise the sub-steps of: a1) comparing all applications on the file system of the device to a local database stored on the machine-readable medium, where each application on the file system of the device that matches an application listed in the local database is determined to be a cryptocurrency related applications or not based on its status in the local database, and where each application on the file system of the device that does not match any application listed in the local database is searched in step a2); a2) searching an application store for all applications on the file system of the device that did not match any application listed in the local database; and a3) for each application on the file system of the device that did not match any application listed in the local database, using NLP on a description of the respective application in the application store and categorize the respective application as be a cryptocurrency related applications or not based on the analysis of the description of the respective application in the application store. The method can further comprise: prior to step a3), performing preprocessing on the description of each respective application on the file system of the device that did not match any application listed in the local database. The preprocessing can comprise at least one of removal of noises, text tokenization, removal of stop words, and word lemmatization. The neural network based model used in step c) can be a CNN based model, such as a CNN based model combined with fuzzy search. Step c) can comprise the sub-steps of: c1) using at least one neural network to filter the images stored on the file system of the device into three categories, the three categories comprising images with no text, images with printed text, and images with handwritten text; c2) using OCR to extract text information from the images with printed text; c3) using HTR to extract text information from the images with handwritten text; and c4) using a fuzzy search to detect cryptocurrency related images based on the extracted text information from the images with printed text and the extracted text information from the images with handwritten text. The method can further comprise: prior to step c1), filtering out from among the images stored on the file system of the device graphics used for a user interface on the device, where step c1) is performed only on the images stored on the file system of the device that are not filtered out in this step. The analyzing of the web browser installed on the file system of the device can comprise analyzing a web history, bookmarks, user credentials, cookies, and/or a cache of the web browser. The device can be, for example, a phone (e.g., a smartphone, such as an Android® smartphone).

BRIEF DESCRIPTION OF DRAWINGS

FIG. 8 shows a table of data folders of popular web browser applications and user data.

FIG. 9 shows a table of results of crypto-related web artifacts discovered using an automated triage approach, according to an embodiment of the subject invention.

FIG. 10 shows a table of a classification report of a classifiers model.

FIG. 11 shows a table of results of crypto-related word search from images.

FIG. 12 shows a table of results from search for crypto-related words.

FIG. 13 shows a table of results from search for mnemonic phrases.

FIG. 14 shows a table of a summary of crypto-related artifacts present on a phone.

FIG. 15 shows a table of a summary of all discovered files containing traces of crypto-related activities for corresponding web browsers.

FIG. 16 shows a table of a summary of discovered forensic evidence.

FIG. 17 shows a table of the amount of recovered crypto-related artifacts discovered by Cellebrite® and an embodiment of the subject invention (labeled as "our approach" in the table).

FIG. 18 shows a table of results of crypto-related web artifacts discovered using an automated triage approach, according to an embodiment of the subject invention.

DETAILED DESCRIPTION

Figure 1:
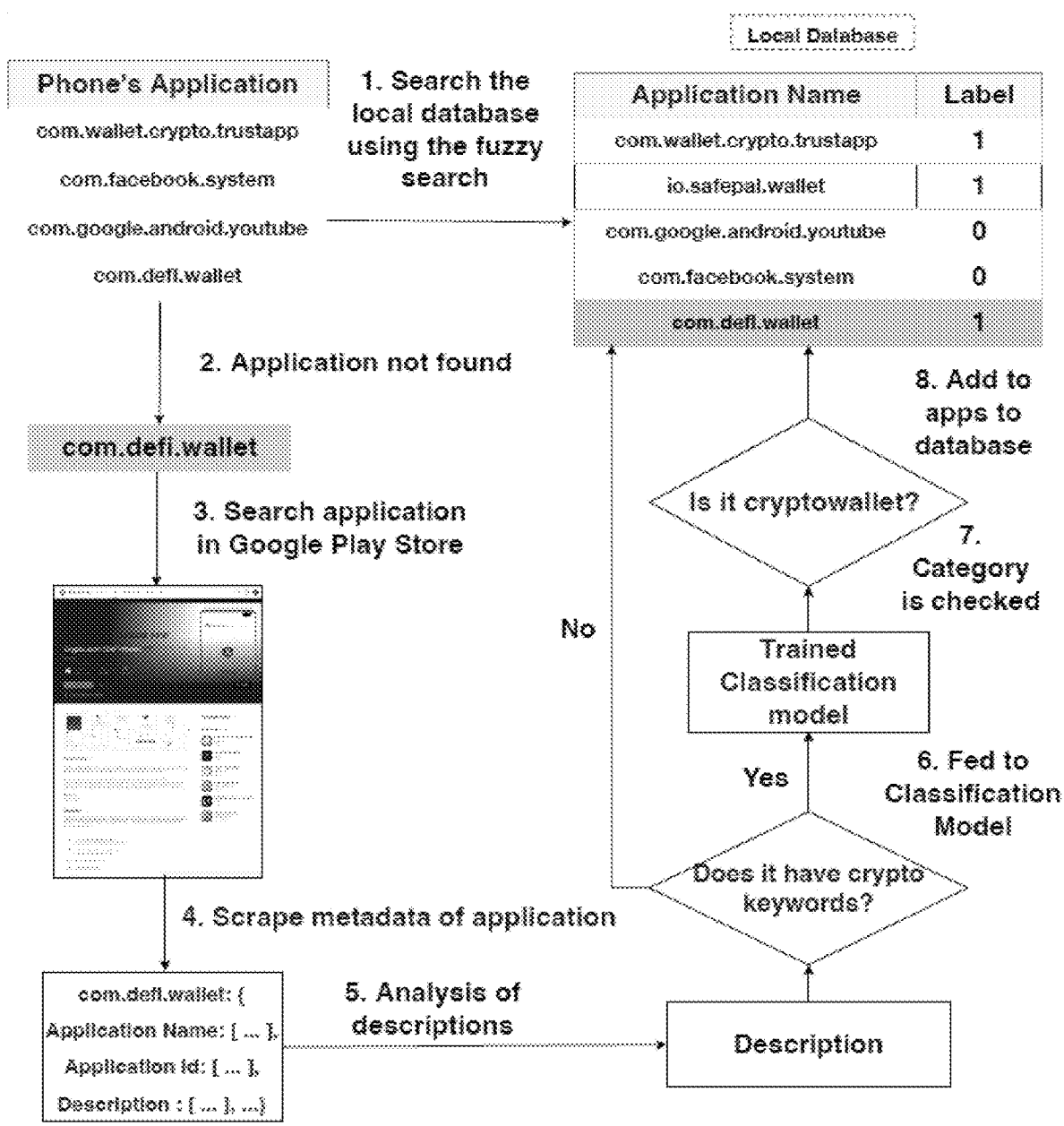
FIG. 1 shows a flow chart for classification of a crypto wallet, according to an embodiment of the subject invention.

Embodiments of the subject invention provide novel and advantageous systems, methods, and frameworks for detecting cryptocurrency wallet (or "crypto wallet") artifacts in a file system (e.g., the file system of a smart device, such as an Android® smart device). The crypto wallet artifacts can be automatically detected and can include: (i) crypto wallet application folders; (ii) images containing crypto artifacts (e.g., mnemonics phrases and/or transactions information); and/or (iii) web browsers artifacts (e.g., cache data, credentials, cookies, and/or bookmarks). This information can be analyzed and extracted using machine learning (ML), natural language processing (NLP), a convolution neural network (CNN), a recurrent neural network (RNN), and/or a string search algorithm. The crypto wallet folders that contain all the application data can be found (e.g., using NLP and/or a ML classification model). The applications can first searched for (e.g., in an application store, such as the Google® Play Store) and their descriptions can be analyzed (e.g., using NLP) to classify whether it is a crypto wallet application. Next, images can be automatically classified into groups (e.g., into the following four groups: images with no-text; printed text; handwritten text; and images with quick response (QR) codes). Then, text information can be extracted: from printed text using optical character recognition (OCR); from handwritten text using handwritten recognition models (HTR) that employ CNN and bidirectional long-short term memory networks; and from QR images using one or more libraries (e.g., Python libraries). From the extracted text, a search is performed for mnemonic phrases that are used as recovery seeds for crypto wallets or any cryptocurrency-related (or "crypto-related") words that help establish a user's interest in cryptocurrency. In order to analyze web history artifacts, the most popular browser on the device can automatically be checked and all its files can be traversed. In the files, crypto-related keywords can be checked (or checked for) using a string search algorithm, and the data can be presented (e.g., on a display, such as via a graphical user interface (GUI)) in a well-formatted structure.

Embodiments of the subject invention function as digital forensics triage tools to provide simple and efficient analysis to quickly detect crypto wallet artifacts in application folders, images, and web browser history on a device (e.g., a smart device, such as a smart device running the Android® operating system (OS) (e.g., a smartphone running the Android® OS). The image of the device can be uploaded to the tool as input, and the tool can process the data to present on a GUI findings related to any cryptocurrency use. These findings can come from applications (apps), images, or browsing history and can be displayed separately with an option to check further details. The tool can integrate contemporary approaches from ML, NLP, and pattern recognition to be able to detect any artifact that may potentially come from recently-launched crypto wallet apps.

The convenience of using cryptocurrencies and the lack of oversight has made them attractive for criminal activities, such as money laundering, drug trade, and tax evasion. Therefore, the artifacts acquired from wallet applications are crucial in digital forensics investigations. At a minimum, they may provide information and evidence that might benefit an ongoing investigation, trace illegal money flows, and possibly help recover stolen money. Wallet applications generally record transaction history on the device storage, which may include cryptocurrency wallet addresses, timestamps, and sent and received transaction amounts. Even more critical artifacts include the private key, mnemonic files, and seed files. If law enforcement could decipher such files, they could unlock the wallet and access the funds inside. In some cases, the wallet can be locked with a password or personal identification number (PIN) set by the user. In such a case, accessing the wallet is more difficult as that password/PIN must be decrypted or found first.

The retrieval of a crypto wallet's artifacts therefore is generally not a very straight-forward process. The most important part is finding the main folder of the crypto wallet application in the file system (e.g., Android® file system), which is typically inside the "/data" directory. In addition, there may be much related and useful information such as photos, browser history, and/or short message service (SMS) messages in other directories of the file system. Considering all of these possibilities for critical artifact search, it is very time-consuming to go over such a large amount of data manually for an area that is changing every day with new applications and methods. Further, time might be critical in some investigations to quickly take action on the crimes.

Embodiments of the subject invention automate the detection and extraction of crypto wallet artifacts and other crypto-related files to help investigators in their triage efforts. Related art methods for forensic analysis of crypto wallets on Android® devices rely on the manual detection of the wallet folder and its artifacts. Namely, only certain crypto wallets are targeted and the artifact detection is thus narrowed down and not generalized. These approaches cannot detect the crypto wallets that are newly introduced.

Embodiments of the subject invention automate the entire artifact detection process to present the detected artifacts to the investigator for further analysis, shortening the amount of time required to search for them (e.g., compared to manual search or less automated search). In addition to finding data directly related to the crypto wallets, any other relevant files inside the device can also be detected, such as documents, images, web cookies, and/or browser history.

In an embodiment, the framework of the system/method can include three components that detect all (or almost all) of the crypto wallet/cryptocurrency related artifacts on a device: 1) dynamically searching and detecting applications using a support vector machine (SVM) and a logistic regression based ML classifier; 2) analysis of images (i.e., pictures) on the device to detect whether there are any cryptocurrency related images; and 3) web browsing analysis of the device to detect whether there is any crypto related browsing activity on the device. With respect to item 2, a CNN-based model combined with a fuzzy search approach can be used. With respect to 3, pictures with both printed and handwritten text on them can be considered; in addition, at least web history, session data, cookies, bookmarks, and/or cache can be checked. The three components have all been implemented and shown to be very accurate. The SVM and logistic regression based ML classifier can detect crypto wallet applications with an accuracy of at least 96% and at least 94%, respectively (e.g., 96.5% and 94.7%, respectively), which outperforms the search of Cellebrite®. The CNN-based model for image classification can have an accuracy of at least 97% (e.g., 98%). Recognizing handwritten text is more challenging, but the accuracy is high enough to be able to accurately read handwritten text on pictures with mnemonic words written thereon. With respect to web browsing analysis, all visited crypto related websites, bookmarked pages, and recovered web history can be identified. The automated approach for the web browser history is more accurate and robust across different Android® browsing applications compared to Cellebrite® analysis.

Cellebrite® Universal Forensic Extraction Device (UFED) and Physical Analyzer are popular forensics tools developed for the detection and extraction of files and application artifacts like images, documents, audio files, and database files from phones, subscriber identity module (SIM) cards, and drones. This software has a partial capability to detect existing crypto wallet applications on Android® devices. Through an interface called "Cryptocurrency Analyzer" in the Physical Analyzer software, it can list the crypto wallets on the device. However, Cellebrite® software cannot detect some of the crypto wallet applications on Android® devices, such as a recent wallet called "Crypto wallet PRO: Earn Crypto". Thus, it appears that the software has a hardcoded list of crypto wallet applications that might be updated only with new updates to the Cellebrite® software. Further, the Physical Analyzer has media classification for image classification but cannot categorize images containing cryptocurrency artifacts and has more general categories like camera, credit cards, faces, and food. Thus, Cellebrite® cannot be relied upon to detect existing crypto wallet artifacts on a device, and embodiments of the subject invention fulfill a need for a more comprehensive and reliable system/method.

Text categorization is extracting information from text and assigning the text or sentences to predefined categories such as positive or negative, spam emails or no-spam, multi-categories like rain or humid or sunny, and so on. In digital forensics, text categorization (e.g., using NLP) can be essential to understanding the context of the collected evidence, especially when analyzing a large quantity of messages in a phone, whether it contains threat or not. This reduces the manual workload when analyzing thousands of text messages in a phone. No related art method exists to understand what kind of cryptocurrency application is installed on a device for forensic analysis.

The categorization of a cryptocurrency application in a phone or other device can accelerate a forensic investigation. This can be achieved by analyzing each application's description to understand its functionality. In NLP, there are several methods for understanding semantics in the text/sentences. The most simple and efficient approach for extracting queries from a textual description or document is Term Frequency-Inverse Document Frequency (TF-IDF) (see also Ramos et al., Using TF-IDF to determine word relevance in document queries, In: Proceedings of the first instructional conference on machine learning, vol. 242, pp. 29-48, Citeseer, 2003; which is hereby incorporated herein by reference in its entirety). TF-IDF extracts words that are important to that description among other documents. First, the term frequency is calculated by counting the frequency of words in the documents. Then, inverse document frequency is calculated by dividing the given document by the total documents containing that term, and then a logarithm is applied to the quotient to achieve the most important words in vector form (see also Liu et al., Research of text classification based on improved TF-IDF algorithm, In: 2018 IEEE International Conference of Intelligent Robotic and Control Engineering (IRCE), pp. 218-222, IEEE, 2018; which is hereby incorporated herein by reference in its entirety). The TF-IDF score for the word in the given document is calculated by multiplying both of those values. Embodiments of the subject invention can utilize TF-IDF for information retrieval from an application description. Alternatively, methods such as modified TD-IDF and/or latent semantic analysis (LSA) could be used (see also Dzisevic et al., Text classification using different feature extraction approaches, In: 2019 Open Conference of Electrical, Electronic and Information Sciences (eStream), pp. 1-4, IEEE, 2019; which is hereby incorporated herein by reference in its entirety).

When it comes to categorization of device applications, metadata (e.g., installs and ratings) does not necessarily improve classification, but information from the title and the description of the application can increase accuracy. Thus, embodiments of the subject invention can utilize information from the title and/or the description of the application, and metadata can be omitted from the categorization of device applications (which can improve the speed and/or free up memory).

Figure 2:
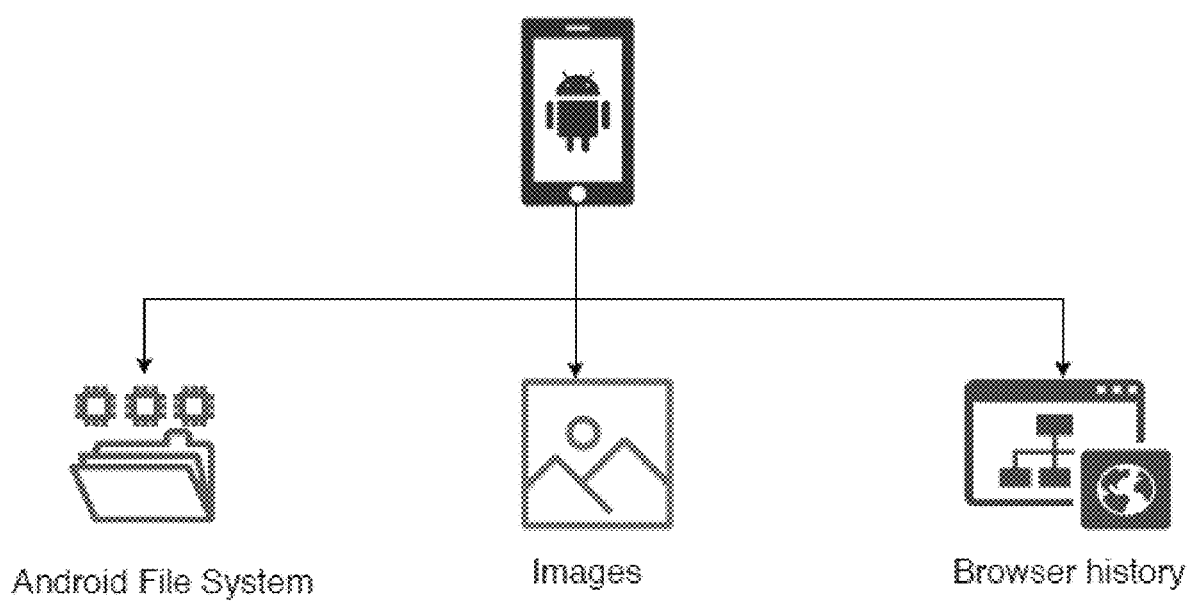
FIG. 2 shows components of crypto wallet artifacts analyzed by a system/framework, according to an embodiment of the subject invention.

In order to analyze crypto wallet artifacts on a given device, embodiments of the subject invention can provide a framework to look into three major components: a) crypto wallet application folder; b) images; and c) browser history (see also FIG. 2, which shows an Android® logo for the device by way of example only). These components are chosen to be investigated based on the usage of crypto wallet apps. Specifically, the artifacts of any crypto wallet application can be its transaction history, different files of its application, mnemonics code or seed phrases, passwords, web uniform resource locators (URLs), cookies, bookmarks, and images (e.g., screenshots and in some cases important credentials captured by an image sensor of the device (e.g., a phone camera)). A comprehensive analysis can be done with a single tool while triaging most of the input data quickly. This can allow investigators of a crime to focus on the genuine evidence on the presented information. Once an image of a device is extracted, the framework can separate the data related to these three components and apply different approaches for artifact searching based on the nature of the data. In some cases, Cellebrite® UFED software can be used to extract data of a device (e.g., a smartphone such as an Android® smartphone). The UFED software can recommend various extraction capabilities depending on the device (e.g., Qualcomm Live extraction may be recommended for devices whose mobile platform is Qualcomm®).

With respect to analysis of the file system of the device, after the data from the device is extracted, each folder in the file system is analyzed. To this end, an algorithm can be used for finding the crypto wallet folders, and FIG. 1 shows a flow chart of the algorithm. An important novel feature in this approach is that it can recognize even a newly deployed crypto wallet application because it depends on ML.

Referring to FIG. 1, first the applications installed on the device are located in the /data folder and each folder name is the same as their application ID in an application store (e.g., Google® Play Store). In Step 1, using a library (e.g., a Python library such as the FuzzyWuzzy Python library), all the applications on the device are compared with a local database where each application is labeled as a crypto wallet application or not. The FuzzyWuzzy library is a string-matching Python library package using the Levenshtein distance, which calculates the differences of the given sequence of strings (see also Cohen, FuzzyWuzzy, 2020, pypi.org/project/fuzzywuzzy/; which is hereby incorporated by reference herein in its entirety).

In Step 2, if the application is not present in the database, application is searched in the application store (e.g., Google® Play Store) with its application ID (Step 3) and all relevant data (e.g., its name, ID, description, developer information) is scraped using a scraping tool (e.g., the Google-Play-Scraper library) as shown in Step 4. The Google-Play-Scraper is a Python library that provides application programming interfaces (APIs) to crawl the Google Play Store without needing any external dependencies (see also JoMingyu, Google-Play-Scraper, 2022, pypi.org/project/google-play-scraper/; which is hereby incorporated by reference herein in its entirety).

In order to categorize the applications, only the application descriptions are selected as shown in Step 5. The application that is searched may not necessarily be a cryptocurrency application but can be any social networking app, game, or productivity app. In Step 6, before feeding it to the classifier, crypto keywords (e.g., crypto, coins, bitcoin, etc.) can be searched in its description using a search module (e.g., FuzzyWuzzy module). Such a list was compiled based on all the crypto wallet app descriptions (i.e., the most frequently used words) that exist on the Google® Play Store, but it can be expanded with more new keywords if needed. The reason for searching crypto keywords in the description is that the model gives better predictions for cryptocurrency applications, and attempting to classify non-crypto applications would just increase the processing time for the model when it has to predict many applications in the device. For instance, the Facebook® app is not a cryptocurrency application and does not include crypto keywords in its description, so skipping the prediction step will reduce the processing time for the whole approach and also increase the model performance when it only has to predict cryptocurrency applications. If the application includes any of the search keywords, then it is fed to the classifier; otherwise the application folder name is added to the local database as a 0 (not crypto wallet). A local database can be maintained to reduce the searches in the application store (e.g., Google® Play Store) and additional processing time to classify the application.

To this end, a preprocessing step can be performed because the application's description may contain noise items (e.g., blank spaces, stop words, emoticons, numbers, and more). These descriptions should be cleaned before the classifying step, which can lead to more accurate classification. The steps performed for preprocessing can include the following, each described in more detail below: removal of noises; text tokenization; removal of stop words; and word lemmatization.

Removal of noises—the noise items (e.g., unreadable format, special characters, parenthesis, white spaces, brackets, punctuation, digits, and emoticons) are removed. The texts are then converted to lowercase characters.

Text tokenization—The text is tokenized by splitting the corpus of words by the tokenizer class of Natural Language Toolkit (NLTK). NLTK is a set of programs providing various NLP data types and processing tasks for English words or sentences (see also Bird, NLTK: The natural language toolkit, In: Proceedings of the COLING/ACL 2006 Interactive Presentation Sessions, pp. 69-72, 2006; which is hereby incorporated by reference herein in its entirety). Tokenizer class is an executable module for converting the text into stream of tokens (e.g., punctuation sign, number, emails, and separate words).

Removal of stop words—Stop words are usually used for forming sentences and can include a, an, but, and before and carry no substantive significance for classifier purposes. In order to reduce dimensionality, all the stop words can be removed.

Word lemmatization—Each word can be reduced to its root form. Plural and tense forms (e.g., past tense, future tense) can be removed (e.g., "made" can be converted to "make").

The selected clean description can be fed to the trained model where it can be classified into four predefined categories: crypto exchange; crypto portfolio; crypto tracker; and crypto wallet. Crypto exchange denotes the applications that provide platforms for the exchange or trading of crypto coins. The crypto portfolio category is for applications that manage the crypto assets or cryptocurrency profile. The crypto tracker category is for applications that track prices and news related to cryptocurrency and blockchain. The crypto wallet category is for the applications that store the private keys of users and help sending and receiving digital currency. The framework is most interested in the crypto wallet category.

In Step 7, the model predicts the category for that application. If the predicted category is crypto wallet, the application name is added to the local database as a 1; else it is added as a 0. This step completes the procedure for deciding whether the application installed on the device is a crypto wallet application or not in the device file system (e.g., Android® file system).

In order to detect crypto related images, ML alone or a combination of ML and fuzzy search methods can be used to locate and extract relevant (crypto related) information from images. Unlike the related art, a comprehensive image analysis for cryptocurrencies can be achieved by integrating image filtering, OCR, handwritten text recognition, text extraction, and fuzzy search. The overall steps of the algorithm are shown in FIG. 3 and discussed below.

Figure 3:
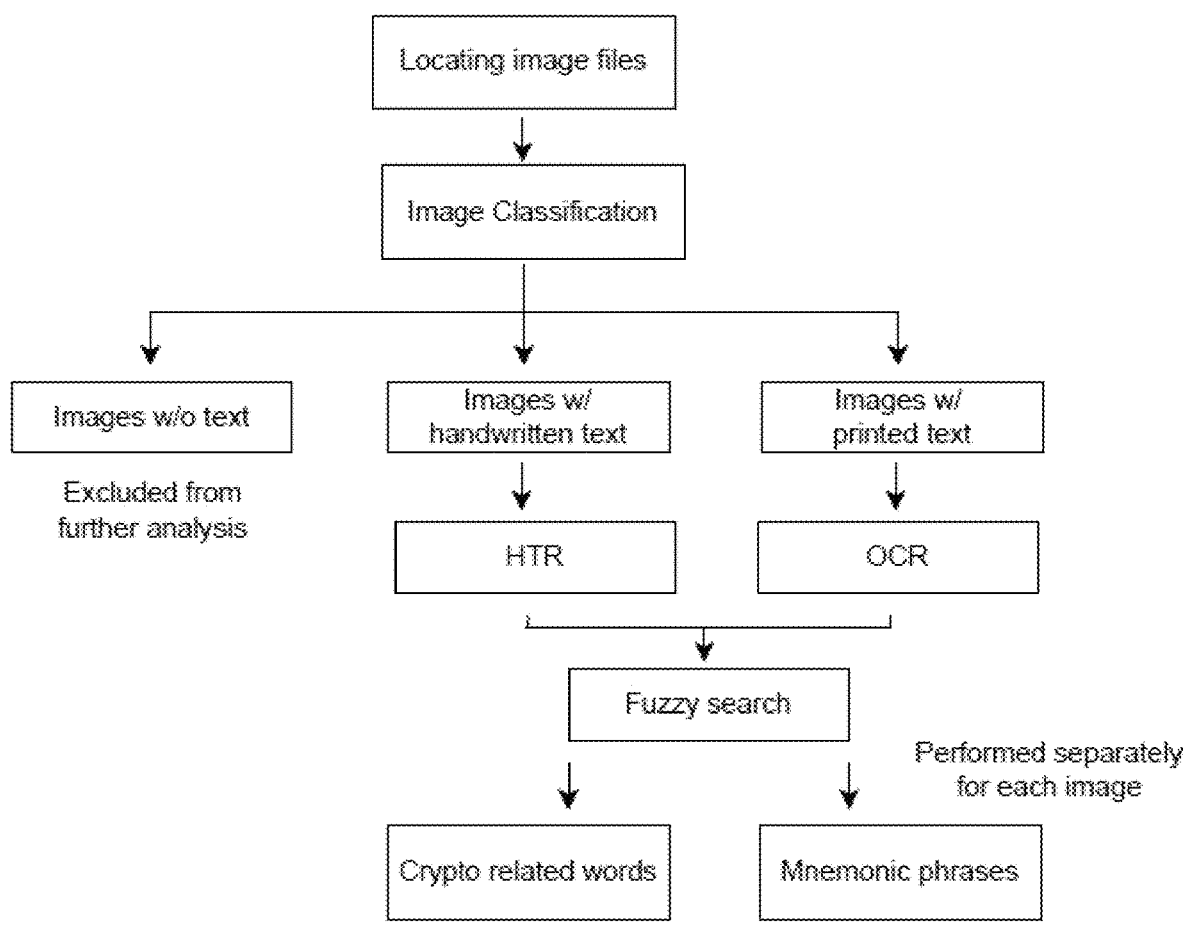
FIG. 3 shows a flow chart for image analysis, according to an embodiment of the subject invention.

Referring to FIG. 3, the graphics used by mobile applications for the user interface (UI), namely the icons, are filtered out as a first step. These graphics typically have small resolution and size and they are in Portable Network Graphics (PNG) format, located mostly in the application folders. Second, using at least one neural network the images are classified into three categories: images with no text; images with printed text; and images with handwritten text. Third, an OCR engine can be used to extract text information from images with printed text. Fourth, an HTR module using at least one CNN model and/or RNN model can be used to extract text information from handwritten images. Finally, a fuzzy search can be used to locate crypto related information and wallet recovery seeds from the extracted text.

Figure 4:
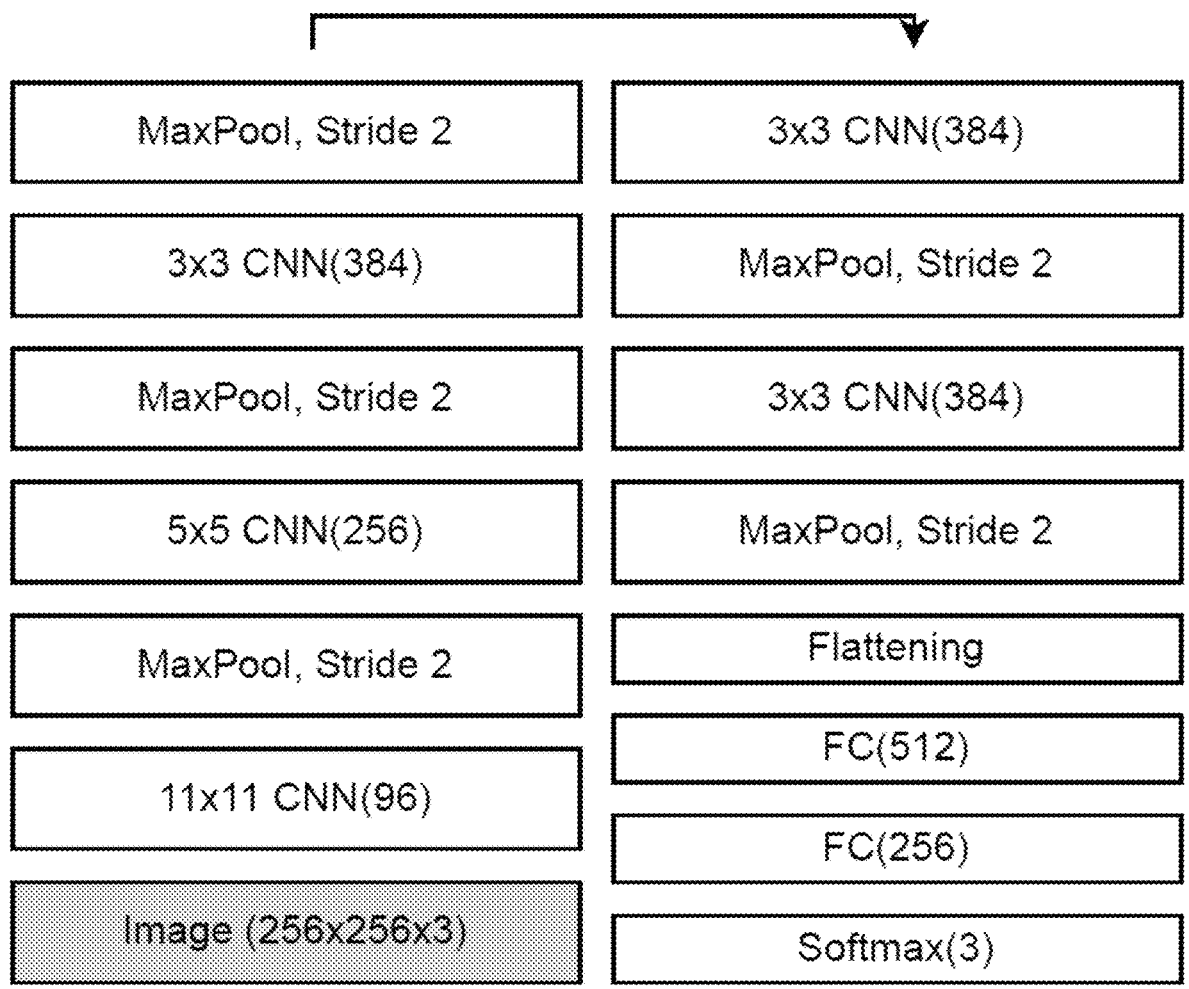
FIG. 4 shows model schematics for image classification, according to an embodiment of the subject invention.

The neural network architecture, as shown in FIG. 4, can implement a modified version of AlexNet (see also Krizhevsky et al., ImageNet classification with deep convolutional neural networks, Advances in neural information processing systems, 2012; which is hereby incorporated by reference herein in its entirety). The model can include (or can consist of) five CNN modules each followed by a maximum pooling (MaxPool) layer, and three fully connected models (FCs). Using the model images can be classified into images with no text, images with printed text and images with handwritten text. Images with no text are removed from further analysis.

Figure 5:
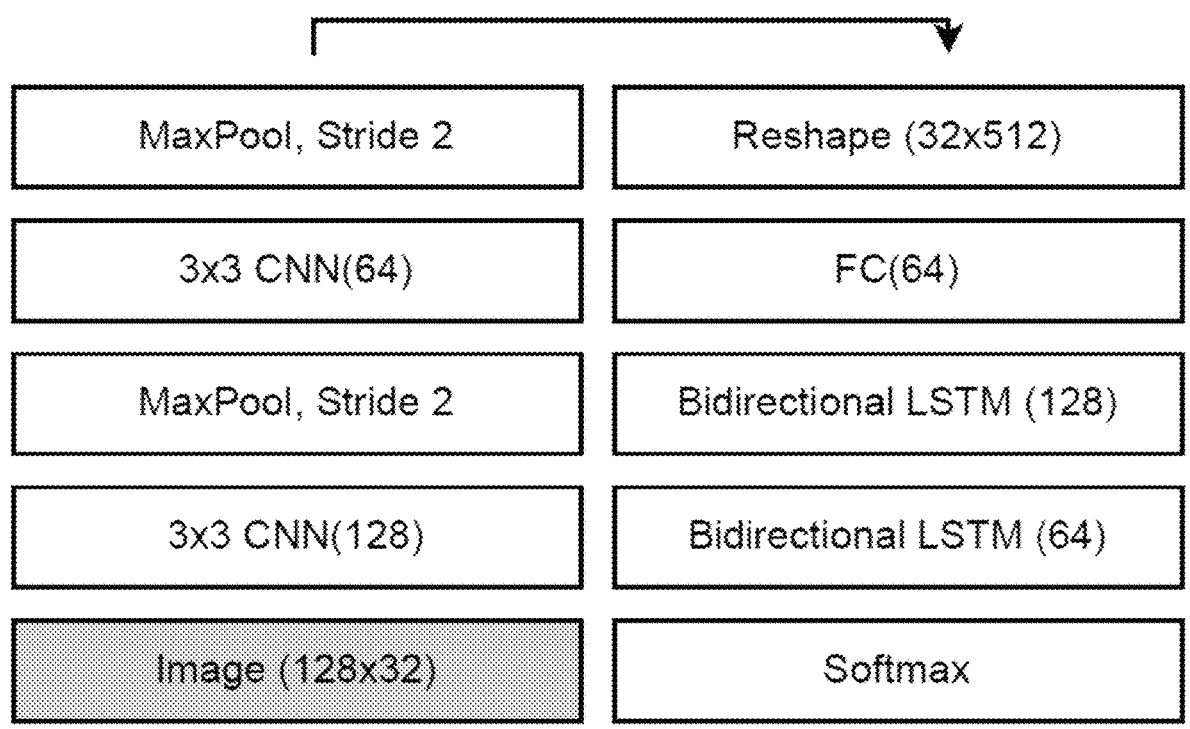
FIG. 5 shows model schematics for handwriting recognition, according to an embodiment of the subject invention.

Prior to running an HTR, text-line and word detection/segmentation techniques can be applied to images to segment lines and then individual words (e.g., in the images). These word segments can then be saved as separate images and fed to the trained model for prediction. The segmentation technique relies on spatial distances between dark/black pixels and groups the connected components into bounding boxes (see also Ha et al., Document page decomposition by the bounding-box project, In: Proceedings of 3rd International Conference on Document Analysis and Recognition, vol. 2, pp. 1119-1122, IEEE, 1995; which is hereby incorporated by reference herein in its entirety). Although many state-of-the-art HTR models use bounding boxes, they are susceptible to errors as handwriting styles and orientation can change significantly across individuals and images. Line and word segmentation can be calculated dynamically and incorporated into an ML model, but this can be computationally expensive as it analyzes the whole page rather than just word segments. Therefore, they can be implemented as separate steps FIG. 5 displays the model architecture for handwriting recognition (see also Keras Team, Handwriting recognition, 2022, github.com/keras-team/keras-io/blob/master/examples/vision/handwriting recognition.py; which is hereby incorporated by reference herein in its entirety). It includes two CNN models followed by a maximum pooling (MaxPool) layer, a fully connected layer, and two bidirectional long short-term memory (LSTM) networks with 25% dropouts. The model uses a Connectionist Temporal Classification (CTC) loss function, which is extensively used in sequence labeling for speech and handwriting recognition as it reduces the need for pre-segmentation of the input and post-processing (see also Graves, Connectionist temporal classification, In: Supervised sequence labelling with recurrent neural networks, pp. 61-93, Springer, 2012; which is hereby incorporated by reference herein in its entirety).

With respect to detecting crypto related browser history, web browser activity is an important component of forensic analysis on a device. Visited websites, search history, and bookmarks can be used to build a detailed profile of a user's interests. However, the related art heavily relies on manual inspection of web browser files. Also, investigators are often required to target a specific web browser, one at a time, resulting in a large amount of time and effort. Embodiments of the subject invention can address these problems by using a triage approach that aims to recover web browser artifacts that unveil crypto-related activities.

The analysis can include recovering and identifying the following forensics artifacts: web history; bookmarks; user credentials; cookies; and/or cache. Web history of the Internet browser information is generally stored in SQLite format and contains timestamps, URLs, search terms, and download information. It reveals the interest of the user and indicates all visited crypto-related websites, if any. Similarly, session data can be used to restore a user's web activity, as it contains a record about open tabs and visited websites.

Bookmarks and user credentials provide more insight into recurring web browsing activity. Moreover, the credential information can allow pinpointing of a suspect's identity and/or aliases, if any. The browser cookies can be used to store information (e.g., user preferences, session information, and personal information), thereby being an additional source for digital profiling of a suspect. Finally, the cache stores images, strings, and scripting data of visited websites, which is normally used to accelerate the time required for the website loading. Therefore, the cache contains the information to support and extend the browsing history evidence.

The table in FIG. 8 shows the web browser application folders where web browsing artifacts are located in four popular web browsers. The structure of the stored information is not constant across various applications, and varies in the folder hierarchy and file types. For example, the files containing the browsing history are generally located inside the "Default/History" folder, while the other artifacts are widely spread out among the data folders of the respective browsers. At the same time, the type of the files storing relevant artifacts varies highly from SQLite database to binary formats. For example, the bookmarks for the Google Chrome browsers are stored as a JSON dictionary, while Samsung Internet stores this information in a SQLite database file.

Embodiments of the subject invention can use an automated tool to read and analyze application files of browsers using the string-searching algorithm. It operates by traversing all files within the web browser's directory and then applying the search to identify and extract the information relevant for the investigation. A starting vector of the cryptocurrency terms can be defined comprising the following three categories: (1) names of the websites for cryptocurrency exchanges; (2) names and abbreviations of the most popular cryptocurrencies; and (3) frequently used cryptocurrency glossary. The first category contains a list of the 50 most used cryptocurrency applications based on the scores derived from the traffic and trading volumes. Similarly, 50 cryptocurrencies can be selected based on the highest exchanged volume for item (2). Finally, publicly available cryptocurrency glossaries can be used to complement the string vector by the terms that indirectly indicate the connection to crypto wallets. The match cases for each browser can then be extracted and presented to the investigator as illustrated by the table in FIG. 9.

Embodiments of the subject invention provide a comprehensive framework for identification of crypto related artifacts on devices (e.g., Android® devices) using three major components. The examination of the crypto wallet application in the file system of the device can be automated using one or more classification models. The algorithm for apps initially searches crypto related applications on a device and compares it to a database. If it is in the database, it locates the crypto related artifacts; otherwise, it dynamically retrieves information from app stores and uses one or more classifiers to define its category and update the database accordingly. Images on the phone can be examined to extract crypto related information using ML and/or fuzzy search methods. These images might include QR codes or screenshots of crypto wallet transactions, or a handwritten note of crypto related information. Automated tools can be used to analyze visited websites, searches, bookmarks cookies, and/or cache to search for crypto related artifacts and browser activity.

Using NLP techniques, embodiments of the subject invention can determine any wallet application installed on a device regardless of its release time. The tool can check the description of the application in the application store (e.g., Google® Play Store) and use NLP and ML techniques to determine the application category. With respect to images, the approach of embodiments of the subject invention ("the subject approach") is the first to offer comprehensive image analyses that use image classification, HTR, OCR, and text extraction. Cellebrite® analyzers can extract browser history, but their analyses are limited to only a few browsers. The subject approach can extract web browser information from more web browsers and can perform the analyses in a relatively short period of time (e.g., 30 or 40 times (or more) faster than Cellebrite®). The subject approach provides a comprehensive method to extract cryptocurrency artifacts with minimal user input much faster than related art systems/methods. With a few clicks, anyone can analyze the file system (e.g., Android® file system) of the device for cryptocurrency artifacts and be presented with a well-structured format.

Embodiments of the subject invention provide a focused technical solution to the focused technical problem of how to forensically analyze a device for possible cryptocurrency artifacts in a fast and efficient manner when investigating a crime. The solution is provided by automatically detecting crypto wallet artifacts in a file system of the device using a combination of ML, NLP, a neural network, and a string search algorithm. This allows for significantly decreasing (or elimination of) manual crypto artifact extraction. Embodiments of the subject invention improve the computer system performing crypto artifact extraction by reducing execution time and therefore conserving computing resources.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

Samsung Galaxy Note 10+, Xiaomi Mi 10T 5G, and Google Pixel 5a phones were used, and different cryptocurrency applications were installed from the Google Play Store. The phones were Qualcomm-based device, and Cellebrite UFED extracted all of the files from each phone using the Qualcomm Live extraction option as recommended by the software.

Example 1—Crypto Wallet Application Analysis Results

A dataset for crypto wallet apps and training had to be created. The app classification model needed to be trained on a dataset before it can classify the Android applications. However, there was no cryptocurrency application dataset publicly available, so a dataset was manually created for training and testing the models. To this end, first a Google Play Store dataset of 2.3 million+ application was downloaded from Kaggle.com (see also Prakash et al., Google play store apps, 2021, www.kaggle.com/datasets/gauthamp10/google-playstore-apps; which is hereby incorporated by reference herein in its entirety). Because the dataset contained different genres of applications, only the finance genre was focused on, and among them crypto related applications were particularly singled out. In order to filter the dataset and select the relevant applications, a Python script was used that checks the description and only selects application having the most common words keywords, such as crypto, bitcoin, blockchain, coins, and cryptocurrency. The final dataset included more than 4000 cryptocurrency applications.

These applications were then labeled manually into predefined categories based on the information provided in their descriptions. Initially, there were 12 categories ranging from crypto wallet to banking but it was later reduced to 4 categories. Some of the applications had crypto keywords in their description but their functionality was not related to cryptocurrency. Some applications like cryptocurrency trading and cryptocurrency exchange had similar functionality, so both were merged into one. Some applications did not match any of the categories and were labeled "Others". After manually labeling the apps, the dataset produced about 720 applications for training the models. Those apps were in the categories as follows: crypto exchange (209 apps); crypto portfolio (70 apps); crypto tracker (161 apps); and crypto wallet (281 apps). After this preprocessing, the categories were converted into numbers ranging from 0 to 3 (0-crypto exchange, 1-crypto portfolio, 2-crypto tracker, and 3-crypto wallet).

With respect to training the models, the classification model cannot process the features from the description that has important keywords in raw textual format. Thus, features need to be picked and have to be converted into a vector form. The important words are determined automatically by TF-IDF from each of the app descriptions. Specifically, all the app descriptions in the dataset are used to create a vocabulary containing all the words and the Term Frequency (TF) of this vocabulary is calculated. Furthermore, Inverse Document Frequency (IDF) is calculated for each of the words. The TF-IDF score is computed by multiplying TF and IDF. If t is the term and d is the document, then the TF-IDF score is calculated as:

$$TF(t, d) = \frac{\text{Number of each } t \text{ in } d}{\text{Total number of } t \text{ in } d} \quad (1)$$

$$IDF(t) = \log\left(\frac{\text{Number of total } d}{\text{Numbers of } d \text{ containing } t}\right) \quad (2)$$

$$TF\text{-}IDF \text{ score} = TF * IDF \quad (3)$$

Note that when a word is the most important in a given document, its TF-IDF score will be higher. In this way, features are extracted and are put in a feature vector for the classifier.

Four classifications models were tested, including random forest, SVM, Naive Bayes, and Logistic Regression. The RandomForestClassifier( ), LinearSVC( ), MultinomialNB( ), and OneVsRestClassifier(LogisticRegression( )) functions, respectively, were used to predict its target category. The dataset was divided into training and testing size of 80% and 20%, respectively.

For each category, TF-IDF and classifier's parameters were tuned. For better accuracy, the parameters of the TF-IDF can be tuned as max_df (it ignores terms with specified maximum frequency), min_df (it ignores terms with specified minimum frequency), norm (normalization of the vector values), and ngram_range (lower and upper boundary for the n-terms either unigrams or bi-grams), and the classifier can be tuned as C (it penalizes misclassified data points) and class weight (balances the class data points). Therefore, the following parameters were used: max_df (0.25, 0.5, 0.75), min_df (1, 2, 3), norm ('l1', 'l2'), ngram_range ((1, 1), (1, 2), (1, 3)). The parameters for linearSVC and Logistic regression classifiers were C(0.01, 0.1, 1) and class weight ('balanced', None) and parameters for random forest classifier were n_estimators(100,200) and max_depth (10,20,30). The training was implemented with these hyperparameters in five cross-validation folds and tuned with its best parameters.

The table in FIG. 10 shows performance metrics for SVM and Logistic regression classifier. Here, the precision means the number of identified positive classes that actually belong to positive classes, and recall means the ratio of true positive classes correctly predicted to the total positive classes. The F1 score shows the model's accuracy, and support indicates the number of classes in each of the target classes.

The model predicted F1 score for SVM and logistic regression as 0.81 and 0.80, respectively. For random forest and Naive Bayes, the F1 score was 0.74 and 0.72, respectively. The SVM and logistic regression had the better performance compared to the others, so they were chosen as the default models in the rest of the experiments.

Looking at these results, the model had a very good accuracy on detecting the crypto wallet applications. The F1 score and accuracy of crypto wallet for SVM and logistic regression classifiers were 0.89 (SVM F1 score), 96.5% (SVM accuracy), 0.88 (logistic regression F1 score), and 94.7% (logistic regression accuracy). This shows that the model with logistic regression can predict crypto wallet based on the application description with very high accuracy.

In FIG. 10, all the categories have a similar F1 score except crypto portfolio because it features applications with different functionality ranging from managing the cryptocurrency assets to crypto mining. Hence, due to the varying descriptions in this category, the F1 score was lower.

The approach of embodiments of the subject invention was also compared to that of the Cellebrite tool. Separate experiments were performed; specifically, applications like Crypto Wallet PRO: Earn Crypto and D-Wallet: Crypto Wallet were installed on the phones because these were the most recently-released crypto wallets in the Google Play Store. Cellebrite Physical Analyzer software was used for the detection of these cryptocurrency applications, but Cellebrite was unable to detect these applications. However, the classification model of embodiments of the subject invention correctly predicted both of them as crypto wallet applications.

Example 2—Crypto Related Image Analysis Results

With respect to text/non-text image classification setup, the neural network analysis was implemented using TensorFlow (see also Abadi et al., TensorFlow: A system for Large-Scale machine learning, In: 12th USENIX symposium on operating systems design and implementation (OSDI 16), pp. 265-283, 2016; which is hereby incorporated by reference herein in its entirety). The model was trained on the training set for 50 epochs with Adam optimizer with the default learning rate (a) of 0.001 (see also Kingma et al., Adam: A method for stochastic optimization, arXiv preprint arXiv:1412.6980, 2014; which is hereby incorporated by reference herein in its entirety). The training dataset included 9080 colored images, which were resized to 256×256 pixels. The original aspect ratio was kept, and padding was applied as necessary. The data were divided into train and test sets in the ratio of 90% and 10%, respectively. Several data resources were used to diversify the training set. Below is the list of these data resources:

i. Non-text image data: 1000 images from ImageNet database (see also Deng et al., ImageNet: A largescale hierarchical image database, In: 2009 IEEE conference on computer vision and pattern recognition, pp. 248-255, IEEE, 2009; which is hereby incorporated by reference herein in its entirety) and 3002 from Flickr30k dataset (see also Young et al., From image descriptions to visual denotations: New similarity metrics for semantic inference over event descriptions, Transactions of the Association for Computational Linguistics 2, 67-78, 2014; which is hereby incorporated by reference herein in its entirety).

ii. Printed-text image data: 322 images from Old Books dataset (see also Barcha et al., Old books dataset, 2017, github.com/PedroBarcha/old-books-dataset; which is hereby incorporated by reference herein in its entirety) and 2997 web screenshots data (see also Aydos, Web-screenshots, 2020, kaggle.com/datasets/aydosphd/web-screenshots; which is hereby incorporated by reference herein in its entirety).

iii. handwritten-text image data: 1042 images from IAM dataset (see also Marti et al., The IAM-database: An English sentence database for offline handwriting recognition. International Journal on Document Analysis and Recognition 5(1), 39-46, 2002; which is hereby incorporated by reference herein in its entirety) and 687 from GNHK dataset (see also Lee et al., GNHK: A dataset for English handwriting in the wild, In: International Conference on Document Analysis and Recognition, pp. 399-412, Springer, 2021; which is hereby incorporated by reference herein in its entirety).

iv. 15 screenshot images generated by the examined phones.

When the model was run on the test set, it was able to classify the images into three categories with 98.57% accuracy.

The handwriting recognition setup used Adam optimizer with the default learning rate of 0.001 (see also Kingma et al., supra.). The model was trained on 96,456 grayscale images for 50 epochs. The data were divided into train, validation, and test sets with ratios of 90%, 5%, and 5%, respectively. In order to ensure uniformity, images were padded to a size of 128×32. The model's accuracy was measured using Levenshtein edit distance, which compares the predicted labels to the actual ones and determines the amount of changes required to convert the former into the latter (see also Konstantinidis, Computing the levenshtein distance of a regular language, In: IEEE Information Theory Workshop, 2005, pp. 4-pp, IEEE, 2005; which is hereby incorporated by reference herein in its entirety). The metric takes the average value of the edit distances, and the mean edit distance for the model was 17.36.

After extracting the text information, it was preprocessed for fuzzy search analysis. The white spaces and single character strings were removed, and the text was converted to all lowercase characters. A spelling-corrected version of the text was also created. Fuzzy search analyses were run with crypto wallet related keywords on both versions of the text. The keywords included the following terms: crypto; currency; wallet; bitcoin; coin; chain; btc; stake; nft; and token. The first five words of the list are commonly used in descriptions of wallet related applications, as discussed herein.

In addition, fuzzy search was conducted on a list of mnemonic phrases, specifically the BIP39 mnemonic phrases used by Bitcoin. This list includes 2048 standard words; each phrase corresponding to a number. A combination of these 12-word phrases are used to record all information needed to recover a bitcoin wallet. The goal was to detect whether a phone included these mnemonic phrases, recovery seeds, in the image files.

Fifteen images were created, including six images with hand-written text, five images of phone screenshots with printed texts, and four images with no text. The handwritten text images included both the paper the text is written on and the background, as they may appear in the real world (see FIG. 6). The printed text images were screenshots of the phone menus, crypto wallet transactions, and QR codes for wallet transactions. These sample images were located in /data/* folder.

Figure 7:
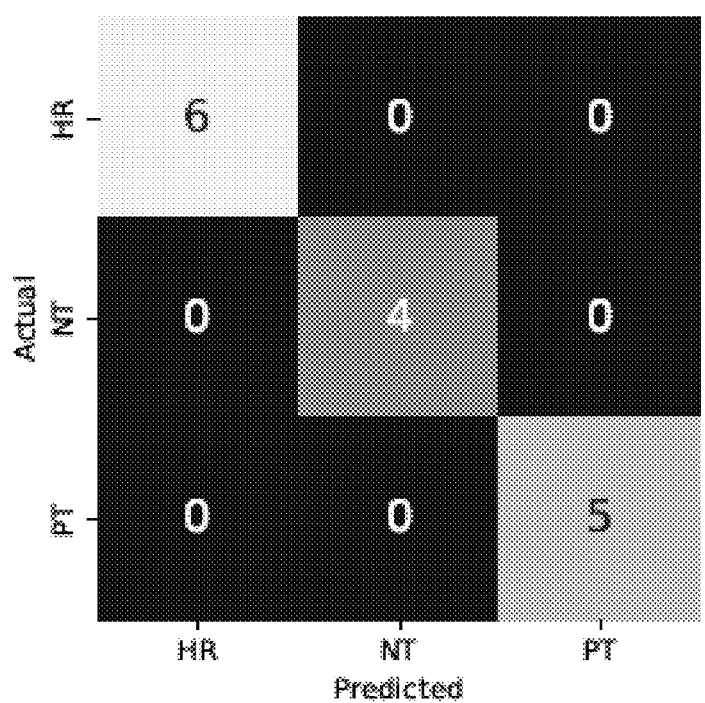
FIG. 7 shows results from image classification, according to an embodiment of the subject invention. PT, NT, and HR denote printed text image, non-text image, and handwritten image, respectively.

The text/non-text classification neural network model successfully predicted the categories of these 15 images with 100% accuracy. FIG. 7 presents the confusion matrix from the results.

Figure 6:
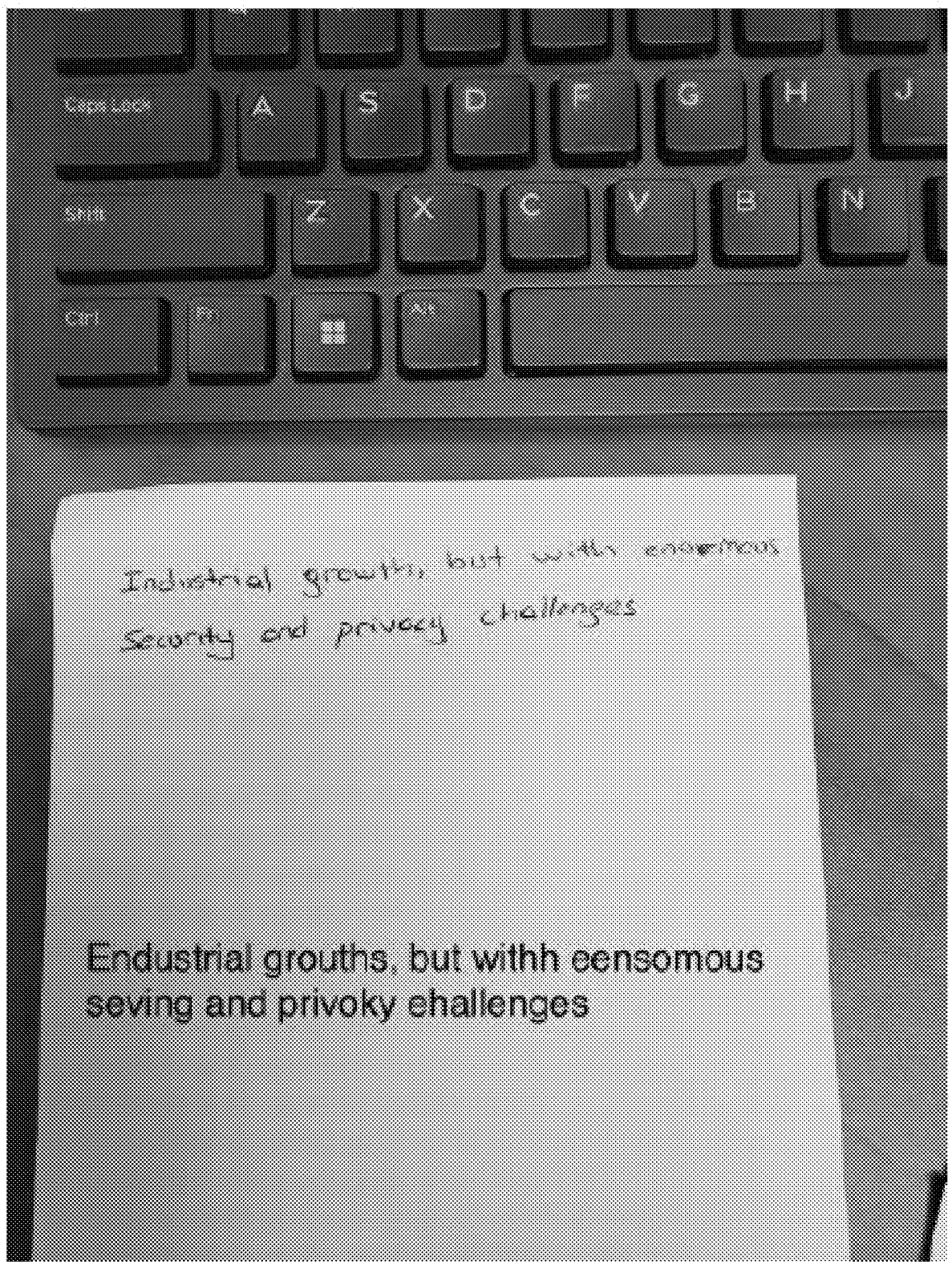
FIG. 6 shows an image with handwritten text and extracted text information at the bottom of the image.

Then, the handwriting recognition model was run on six handwriting images. FIG. 6 displays one of these images with extracted text displayed at the bottom. As seen in FIG. 6, handwriting recognition may not always accurately recognize all words. Therefore, if a forensic analyst finds evidence of cryptocurrency activity on a phone, they may choose to manually examine the handwritten images, depending on the quantity.

Next, the OCR machine was run on printed text images and a fuzzy search was performed on the extracted text. The analysis used a maximum Levenshtein distance of one, meaning that the words differing from the keywords by one or fewer alteration were considered. FIG. 11 shows a table of crypto wallet related words extracted from the images. Out of ten keywords, the images included seven crypto currency related words. The results show that the model successfully extracted all relevant keywords.

Performance was also evaluated using two common metrics: recall and precision rates (see also Faustina et al., A survey on text information extraction from borndigital and scene text images, Proceedings of the National Academy of Sciences, India Section A: Physical Sciences 89(1), 77-101, 2019; which is hereby incorporated by reference herein in its entirety). The table in FIG. 12 presents the results. The OCR method was able to extract printed text with recall and precision rates of approximately 90%. The HTR method was relatively less successful, with recall and precision rates of approximately 65%. Even at these levels, it can be reasonably argued that an image on a phone contains wallet artifacts.

The table in FIG. 13 presents results from fuzzy search analysis of mnemonic phrases. Success was measured using a modified version of recall rate. Mnemonic phrases include standard English words, so a long text may contain several such words even though the text does not include a recovery seed. In order to account for this, the recall rate is penalized for longer text. As shown in Equation 4, recall rate is multiplied with a weight that decreases as the number of recognized mnemonic phrases deviates from 12.

$$P = \frac{m}{\text{\# of mnemonic phrases}} \times w \quad (4)$$

$$w = \begin{cases} \exp\frac{\eta - 11}{\eta}, & \eta \leq 12 \\ \exp\frac{13 - \eta}{\eta}, & \eta > 12 \end{cases}$$

where m is the number of extracted mnemonic phrases, w is the weight, and η is the total number of extracted words.

In the sample, only three of the images (handwritten image 1, handwritten image 3, and handwritten image 6) contained a recovery seed. These were predicted with over 70% accuracy. As expected, the results show low recall rates for images that do not include the mnemonic phrases. However, as discussed earlier mnemonic phrases include ordinary words. Thus, longer text may produce false positives. Therefore, forensic analysts are advised to examine closely cases with recall rates of 50% and higher.

Example 3—Browser History Analysis Results

In order to demonstrate the effectiveness of the approach of embodiments of the subject invention, cryptocurrency websites were browsed using Google Chrome, Android Browser, Opera, and Firefox applications. The table in FIG. 14 presents a full list of the crypto related artifacts created on the phone of interest. The performance of the tool was evaluated based on: (1) the detection accuracy for crypto artifacts (i.e., the ability to identify all previously created crypto artifacts); (2) the robustness across various browsers (i.e., the ability to extract crypto data from each of the targeted browser); and (3) time consumption.

First, the tool's effectiveness to identify crypto related data was analyzed. Three file types were identified: SQLite database; JSON dictionary; and other. However, due to the large diversity of the file types containing the browsing activity, two standalone categories were identified as SQLite database and JSON dictionary, while the other types were classified as plain text. The table in FIG. 15 presents a summary of all discovered files for each browser filtered by the type.

The table in FIG. 16 lists a summary of the crypto related forensic evidence extracted for each browser. While not illustrated, the tool also provided the location for each forensics data type, which generally corresponds to a single file per type, except for cache data. The locations for cache data are located in the "/cache/" folder found in the home path of the Android browser applications. However, the type of recovered data varies across the browser applications. For example, Quota Manager data is only applicable for Google Chrome and Samsung Internet applications, while Opera and Firefox apps store the automatically provided browsing suggestions.

In order to further demonstrate the effectiveness of the approach of embodiments of the subject invention, it was compared with the Cellebrite analysis. The table in FIG. 17 illustrates the amount of the artifacts detected by both Cellebrite and the subject approach based on the initial list of the artifacts in FIG. 14. Specifically, the Cellebrite analysis did not recover the data for freewallet.org and binance.com. Moreover, the Cellebrite analysis did not contain any artifacts from the Firefox browser, while only discovering a limited history for the Opera browser. On the contrary, the subject approach allowed recovery of all crypto-related artifacts for each of the four browsers under investigation. Therefore, the subject approach outperforms the Cellebrite analysis for the browser history analysis of the crypto related artifacts in both detection accuracy and robustness across all browsers. Finally, when comparing the processing time, the subject approach finished analyzing the browser artifacts within 10 seconds compared to the Cellebrite processing the data for approximately 7 minutes.

The table in FIG. 18 presents a summary of all artifacts detected by the subject approach, which was able to successfully identify all visited cryptocurrency websites and bookmarked pages, recover the Google search information, and partially reveal personal user data for each web browser. Moreover, the cookies and cache data provide significant evidence with respect to the user's activity for each of the crypto related websites. Also, while revealing the presence of the credential data for Firefox, the subject approach did not recover encrypted login credentials, but only the website it was used for, such as coinbase.com.

According to the evaluation, the subject approach for web browser activity provides a comprehensive summary of all the artifacts related to the cryptocurrency investigation. Moreover, all manually created artifacts listed in FIG. 14 were able to be robustly extracted for each Android web browser application. The majority of the important crypto activity traces were listed in the format provided in FIG. 9, allowing visited websites, bookmarks, and account data to be quickly identified. The automated extraction of the data and its further categorization resulted in significant reduction of time and effort required for forensics analysis of the web browsers.

Examples 1-3 shows that all crypto wallet artifacts on devices (e.g., Android® phones) can be identified and classified, and this is not possible with existing tools such as Cellebrite. The subject approach significantly reduces the amount of time and effort to implement forensics analysis on devices (e.g., Android® phones).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for detecting cryptocurrency wallet artifacts in a file system of a device, the system comprising:
   a processor;
   a display; and
   a machine-readable medium in operable communication with the processor and the display and having instructions stored thereon that, when executed by the processor, perform the following steps:
   a) searching the file system of the device using a machine learning (ML) classifier to detect cryptocurrency related applications installed on the device;
   b) generating a first list of cryptocurrency related applications installed on the device based on step a);
   c) analyzing images stored on the file system of the device using a neural network based model to detect cryptocurrency related images stored on the device;
   d) generating a second list of cryptocurrency related images stored on the device based on step c);
   e) analyzing a web browser installed on the file system of the device to detect cryptocurrency related browsing activity on the device;
   f) generating a third list of cryptocurrency related browsing activity on the device based on step e); and
   g) displaying, on the display via a graphical user interface stored on the machine-readable medium, the first list, the second list, and the third list.

2. The system according to claim 1, the ML classifier used in step a) comprising a logistic regression based ML classifier.

3. The system according to claim 1, the ML classifier used in step a) comprising a support vector machine (SVM).

4. The system according to claim 1, step a) comprising the sub-steps of:
   a1) comparing all applications on the file system of the device to a local database stored on the machine-readable medium, where each application on the file system of the device that matches an application listed in the local database is determined to be a cryptocurrency related applications or not based on its status in the local database, and where each application on the file system of the device that does not match any application listed in the local database is searched in step a2);
   a2) searching an application store for all applications on the file system of the device that did not match any application listed in the local database; and
   a3) for each application on the file system of the device that did not match any application listed in the local database, using natural language processing (NLP) on a description of the respective application in the application store and categorize the respective application as be a cryptocurrency related applications or not based on the analysis of the description of the respective application in the application store.

5. The system according to claim 4, the instructions when executed further performing the following step:
   prior to step a3), performing preprocessing on the description of each respective application on the file system of the device that did not match any application listed in the local database,
   the preprocessing comprising at least one of removal of noises, text tokenization, removal of stop words, and word lemmatization.

6. The system according to claim 1, the neural network based model used in step c) being a convolutional neural network (CNN) based model.

7. The system according to claim 1, the neural network based model used in step c) being a CNN based model combined with fuzzy search.

8. The system according to claim 1, step c) comprising the sub-steps of:
   c1) using a neural network to filter the images stored on the file system of the device into three categories, the three categories comprising images with no text, images with printed text, and images with handwritten text;
   c2) using optical character recognition (OCR) to extract text information from the images with printed text;
   c3) using handwriting text recognition (HTR) to extract text information from the images with handwritten text; and
   c4) using a fuzzy search to detect cryptocurrency related images based on the extracted text information from the images with printed text and the extracted text information from the images with handwritten text.

9. The system according to claim 8, the instructions when executed further performing the following step:
   prior to step c1), filtering out from among the images stored on the file system of the device graphics used for a user interface on the device, where step c1) is performed only on the images stored on the file system of the device that are not filtered out in this step.

10. The system according to claim 1, the analyzing of the web browser installed on the file system of the device comprising analyzing a web history, bookmarks, user credentials, cookies, and a cache of the web browser.

11. A method for detecting cryptocurrency wallet artifacts in a file system of a device, the method comprising:
    a) searching the file system of the device using a machine learning (ML) classifier to detect cryptocurrency related applications installed on the device;
    b) generating a first list of cryptocurrency related applications installed on the device based on step a);

c) analyzing images stored on the file system of the device using a neural network based model to detect cryptocurrency related images stored on the device;

d) generating a second list of cryptocurrency related images stored on the device based on step c);

e) analyzing a web browser installed on the file system of the device to detect cryptocurrency related browsing activity on the device;

f) generating a third list of cryptocurrency related browsing activity on the device based on step e); and g) displaying, on a display via a graphical user interface, the first list, the second list, and the third list.

12. The method according to claim 11, the ML classifier used in step a) comprising at least one of a logistic regression based ML classifier and a support vector machine (SVM).

13. The method according to claim 11, step a) comprising the sub-steps of:

a1) comparing all applications on the file system of the device to a local database stored on the machine-readable medium, where each application on the file system of the device that matches an application listed in the local database is determined to be a cryptocurrency related applications or not based on its status in the local database, and where each application on the file system of the device that does not match any application listed in the local database is searched in step a2);

a2) searching an application store for all applications on the file system of the device that did not match any application listed in the local database; and a3) for each application on the file system of the device that did not match any application listed in the local database, using natural language processing (NLP) on a description of the respective application in the application store and categorize the respective application as be a cryptocurrency related applications or not based on the analysis of the description of the respective application in the application store.

14. The method according to claim 13, further comprising:

prior to step a3), performing preprocessing on the description of each respective application on the file system of the device that did not match any application listed in the local database, the preprocessing comprising at least one of removal of noises, text tokenization, removal of stop words, and word lemmatization.

15. The method according to claim 11, the neural network based model used in step c) being a convolutional neural network (CNN) based model.

16. The method according to claim 11, the neural network based model used in step c) being a CNN based model combined with fuzzy search.

17. The method according to claim 11, step c) comprising the sub-steps of:

c1) using a neural network to filter the images stored on the file system of the device into three categories, the three categories comprising images with no text, images with printed text, and images with handwritten text;

c2) using optical character recognition (OCR) to extract text information from the images with printed text;

c3) using handwriting text recognition (HTR) to extract text information from the images with handwritten text; and c4) using a fuzzy search to detect cryptocurrency related images based on the extracted text information from the images with printed text and the extracted text information from the images with handwritten text.

18. The method according to claim 17, further comprising:

prior to step c1), filtering out from among the images stored on the file system of the device graphics used for a user interface on the device, where step c1) is performed only on the images stored on the file system of the device that are not filtered out in this step.

19. The method according to claim 11, the analyzing of the web browser installed on the file system of the device comprising analyzing a web history, bookmarks, user credentials, cookies, and a cache of the web browser.

20. A system for detecting cryptocurrency wallet artifacts in a file system of a device, the system comprising:

a processor;

a display; and a machine-readable medium in operable communication with the processor and the display and having instructions stored thereon that, when executed by the processor, perform the following steps:

a) searching the file system of the device using a machine learning (ML) classifier to detect cryptocurrency related applications installed on the device;

b) generating a first list of cryptocurrency related applications installed on the device based on step a);

c) analyzing images stored on the file system of the device using a neural network based model to detect cryptocurrency related images stored on the device;

d) generating a second list of cryptocurrency related images stored on the device based on step c);

e) analyzing a web browser installed on the file system of the device to detect cryptocurrency related browsing activity on the device;

f) generating a third list of cryptocurrency related browsing activity on the device based on step e); and g) displaying, on the display via a graphical user interface stored on the machine-readable medium, the first list, the second list, and the third list, the ML classifier used in step a) comprising at least one of a logistic regression based ML classifier and a support vector machine (SVM), step a) comprising the sub-steps of:

a1) comparing all applications on the file system of the device to a local database stored on the machine-readable medium, where each application on the file system of the device that matches an application listed in the local database is determined to be a cryptocurrency related applications or not based on its status in the local database, and where each application on the file system of the device that does not match any application listed in the local database is searched in step a2);

a2) searching an application store for all applications on the file system of the device that did not match any application listed in the local database; and a3) for each application on the file system of the device that did not match any application listed in the local database, using natural language processing (NLP) on a description of the respective application in the application store and categorize the respective application as be a cryptocurrency related applications or not based on the analysis of the description of the respective application in the application store, the neural network based model used in step c) being a convolutional neural network (CNN) based model combined with fuzzy search, step c) comprising the sub-steps of:
- c1) using at least one CNN model to filter the images stored on the file system of the device into three categories, the three categories comprising images with no text, images with printed text, and images with handwritten text;
- c2) using optical character recognition (OCR) to extract text information from the images with printed text;
- c3) using handwriting text recognition (HTR) to extract text information from the images with handwritten text; and
- c4) using a fuzzy search to detect cryptocurrency related images based on the extracted text information from the images with printed text and the extracted text information from the images with handwritten text, the instructions when executed further performing the following steps:
- prior to step a3), performing preprocessing on the description of each respective application on the file system of the device that did not match any application listed in the local database; and
- prior to step c1), filtering out from among the images stored on the file system of the device graphics used for a user interface on the device, where step c1) is performed only on the images stored on the file system of the device that are not filtered out in this step, the preprocessing comprising removal of noises, text tokenization, removal of stop words, and word lemmatization, and the analyzing of the web browser installed on the file system of the device comprising analyzing a web history, bookmarks, user credentials, cookies, and a cache of the web browser.

\* \* \* \* \*